Patented Nov. 21, 1922.

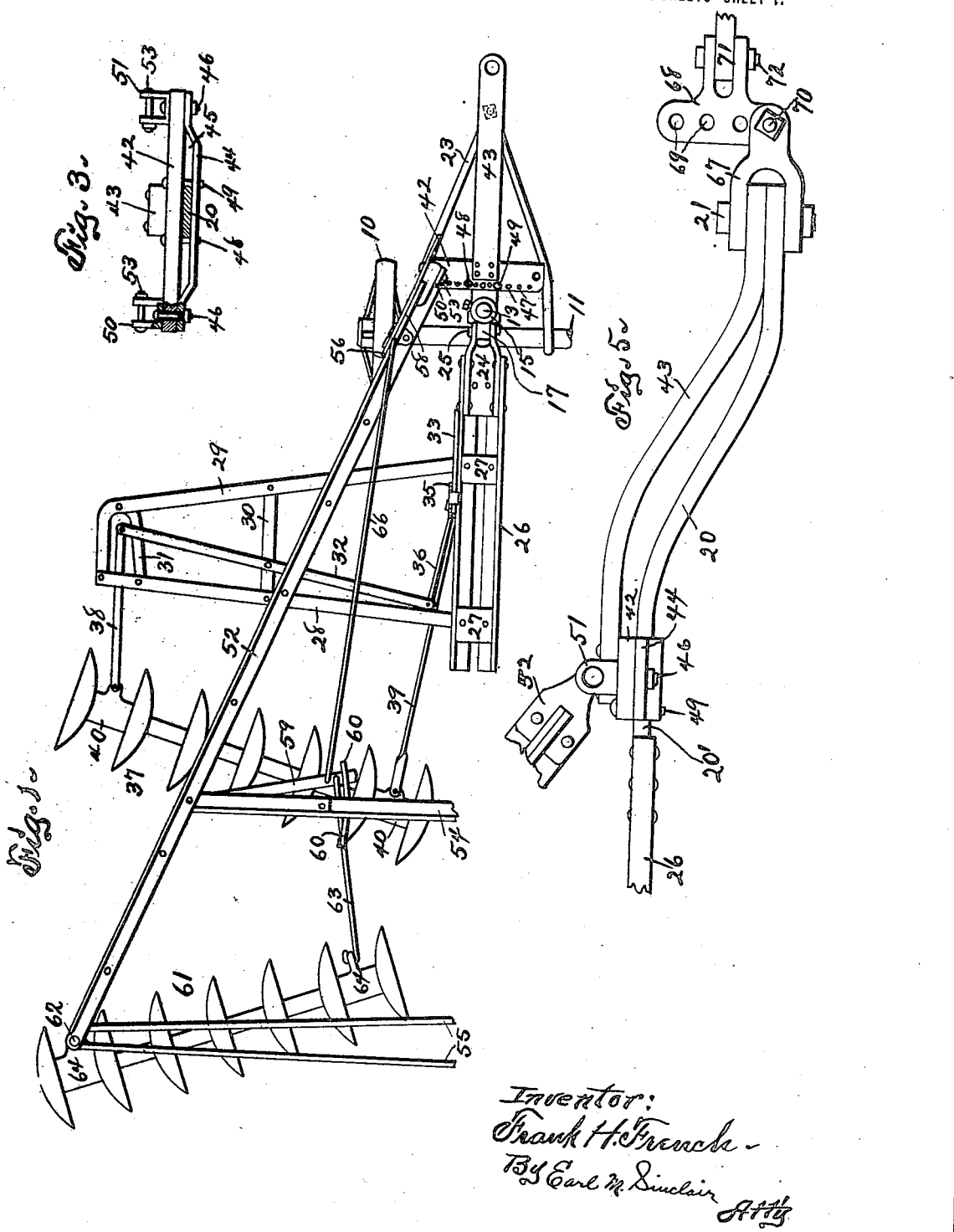

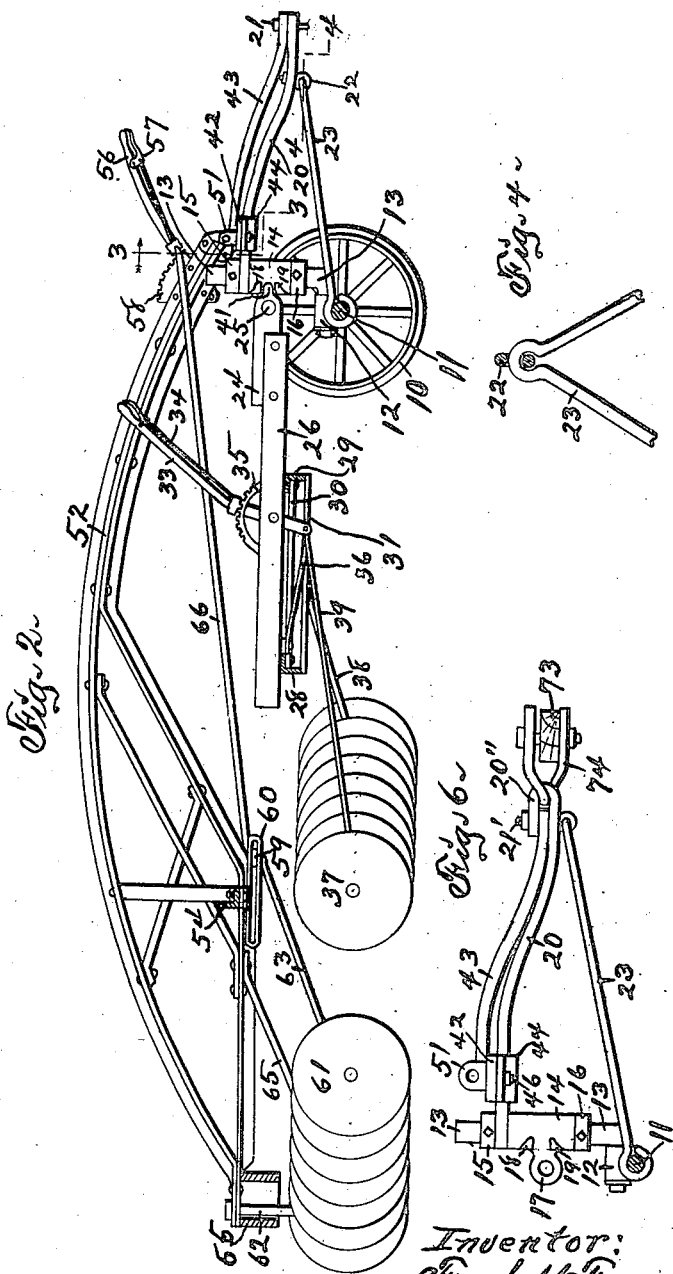

1,436,391

UNITED STATES PATENT OFFICE.

FRANK H. FRENCH, OF PRESTON, IOWA.

DRAFT MEANS FOR TANDEM DISK HARROWS.

Application filed October 28, 1920. Serial No. 420,111.

*To all whom it may concern:*

Be it known that I, FRANK H. FRENCH, a citizen of the United States of America, and resident of Preston, Jackson County, Iowa, have invented a new and useful Draft Means for Tandem Disk Harrows, of which the following is a specification.

The primary object of this invention is to provide means for independently and pivotally or flexibly connecting separate disk gangs, in tandem relation to each other, or other trailer devices of single or plural form to a prime mover.

Another object of this invention is to provide means for connecting separate and independent disk gangs to a prime mover separately and interchangeably or conjunctively in tandem relation, the operation of either disk gang, when used in tandem relation, being independent of the other gang and dependent on the connection to the prime mover.

Another object of this invention is to provide means for connecting a selected disk gang to a prime mover independent of any other disk gang, of a tandem series provided.

Another object of this invention is to provide means for connecting more than one disk gangs to a prime mover, the disk gangs being in tandem relation, the connection between the gangs and the prime mover being conjunctive, the operation of the gangs being independent of each other and separately dependent on the connection made to the prime mover.

Another object of this invention is to provide a draft means or connector adapted for attachment to a prime mover and also adapted for attachment to one or more disk gangs, which gangs (when more than one are used) being in tandem relation and independent in function and operation of each other.

Another object of this invention is to provide for such arrangement of disk gangs and their attachment to a prime mover that said gangs are in tandem relation to said prime mover and to each other and are independent of each other and separable for selective use and operation.

Another object of this invention is to provide means for lengthening the line of draft on the rear gangs of a tandem disk harrow and thereby reducing the angle between said line of draft and the surface of soil and increasing the penetration of the disks of said rear gangs.

Another object of this invention is to facilitate turning a corner with a disc harrow of tandem type or with other trailer devices.

Another object of this invention is to provide means in a connector (between a prime mover and tandem disk gangs) for adjusting the trailing function of the gangs relative to the prime mover, whereby in changing the direction of travel of the implement the gangs are caused to travel in different curves.

Another object of this invention is to provide means in a connector (between a prime mover and tandem disk gangs) for adjusting the line of draft of one gang relative to the line of draft of another gang to effect a desirable trailing relation of the gangs.

Another object of this invention is to provide means for interchangeably connecting disk gangs to different prime movers or draft powers.

Another object of this invention is to provide means for selectively employing different prime movers or draft powers (such as animals or tractors) in drawing disk gangs, different connecting means being employed which present different functions and effects in respect of rigidity or flexibility.

My invention consists in the construction, arrangement and combination of elements hereinafter set forth, pointed out in the claims and illustrated by the accompanying drawing, in which—

Figure 1 is a plan of the draft means and substantially one-half of the frame and gang structure, illustrating the arrangement and relation of disk gangs tandem to each other and to the draft means. Figure 2 is an elevation, partly in section, of the elements shown in Figure 1. Figure 3 is a cross-section, on an enlarged scale, on the indicated line 3—3 of Figure 2. Figure 4 is a detail section, on an enlarged scale, on the indicated line 4—4 of Figure 2.

Figure 5 is an elevation, on an enlarged scale, showing means employed to attach disk gangs to a tractor without using a tongue-truck.

Figure 6 is an elevation, on an enlarged scale, showing means employed to attach one or more disk gangs to a whiffle-tree for animal draft, a tongue-truck being employed.

In the construction of the device or implement as shown, the numeral 10 designates one of a pair of caster wheels adapted to journal on the ends of and carry a horizontal axle 11. A block 12 is mounted on the axle 11 between the wheels and the axle may rotate in said block or the wheels may rotate on the ends of the axle as desired. A caster stem 13, of right-angled form, has its horizontal arm arranged at right angles to and extending across and above the central portion of the axle 11 and journaled in the central portion of the block 12, while an upright arm of said stem is journaled in and extends through a coupling-head 14, there being set-collars 15, 16 on said arm above and below the head, whereby said head may be adjusted vertically relative to the axle. The coupling-head 14 is formed with an eye 17 on and extending rearwardly from its central portion above and across the vertical plane of the axle 11; and said head also is formed with spaced lugs 18, 19 on opposite sides of the base of said eye and projecting laterally therefrom for a purpose hereinafter made clear. A draft-bar 20 is formed with a hole in one end adapted to receive the upright arm of the caster stem 13 and pivot thereon, said end of the bar being confined between the set-collar 15 and the upper end portion of the coupling-head 14. The opposite end portion of the draft-bar 20 is formed with a hole adapted to receive a bolt 21 for a purpose hereinafter made clear. An eye-bolt 22 is mounted in and depends from the draft-bar 20 and a brace-yoke 23 extends through and is engaged flexibly at its center by the eye of said bolt, the end-portions of said brace-yoke being bent to form eyes and embracing loosely the axle 11 adjacent to the wheels 10. The flexible connection between the eye-bolt 22 and brace-yoke 23 and the loose (pivotal) connections of the brace-yoke and axle permit of vertical adjustment of the coupling-head 14 on the upright arm of the caster stem 13. A coupling member 24, formed as a channel-yoke, the body being channeled and the side flanges being extended beyond the bottom at its forward end to form a yoke, is arranged at the rear of the coupling head 14 and the yoke thereof embraces the eye 17 and is formed with apertures registering with said eye and adapted to receive a coupling-bolt 25. The aperture in the eye 17 preferably is bushed in order that the yoke end and eye may have some movement of oscillation relative to each other on the axis of the bolt 25, thus providing articulation on a horizontal axis at such place. A stub-tongue 26 is arranged at the rear of the coupling head 14 and preferably is constructed of angle-bars arranged parallel and spaced apart, the horizontal flanges of the angle-bars being directed toward each other from the bottom margins of the vertical flanges of said bars and being connected by tie-plates 27, thus forming a channel adapted to receive and be fixed to the body of the coupling member 24. A transverse frame is mounted beneath, extends across and is suspended by the stub-tongue 26 at the rear of the coupling member 24. This frame preferably is horizontal and constructed of a straight rear angle-bar 28, having its horizontal flange uppermost and extending forwardly from the vertical flange and suspended from the stub-tongue 26 by the same bolts employed to connect the tie-plate 27 near the rear end of the tongue, and a bent angle-bar 29 arranged in front of the bar 28, having its horizontal flange uppermost and extending rearwardly from its vertical flange and suspended from the stub-tongue by the same bolts employed to connect the tie-plate 27 nearest to the coupling member 24, said angle-bars being tied together between their ends by cross-bars 30, 31, two of which are shown in Figure 1. The greatest width of the transverse frame is at its center and end portions of the bar 29 preferably are bent rearward to form ends of the frame and are secured to ends of the bar 28. An evener bar 32 is fulcrumed between its ends on the cross-bar 30 and is adapted for oscillation within the transverse frame. A hand-lever 33 is fulcrumed in upright position on the stub-tongue 26 and is provided with detent devices 34 adapted to engage a toothed segment 35 on the stub-tongue at times and hold said lever in any position in which it may be placed manually. A rod 36 pivotally connects the lower end of the lever 33 and inner end of the evener bar 32, whereby any oscillation of the lever is communicated to and oscillates the evener bar. A disk gang 37 is located at the rear of and in a lower plane than the transverse frame. One end portion of the disk gang 37 is pivotally connected to the outer end of the evener bar 32 by a rod 38 and the inner end portion of the disk gang is pivotally connected to the lower end of the lever 33 by a rod 39, suitable boxes or bearings 40 being employed to make the rod connections to the gang shafts, and the evener bar and gang shaft being substantially parallel.

It is to be understood that the evener bar 32, lever 33, gang 37 and rods 38, 39 are duplicated on the opposite side of the stub-tongue from those parts shown. The coupling member 24 is formed with lugs 41, one at the end of each arm of its yoke, adapted to extend loosely between the lugs 18, 19 on the coupling head 14; the lugs 41 having a range of movement between the other lugs to provide a limited oscillation of the coupling-head relative to the coupling member and compensate for variations due to travel of the wheels 10 over uneven surfaces. In the use of the machine as thus far described there is flexibility between the stub-tongue 26 and tongue-truck and also between the disk gang 37 and stub-tongue, on horizontal axes, thus compensating for a rigid connection, if desired, between the forward end of the draft-bar 20 and a prime-mover such as a tractor. A plate 42 may be mounted transversely of and extend at both ends materially from the draft-bar 20 in front of the set-collar 15. A secondary draft-bar 43 is fixed to and extends forwardly from the central portion of the plate 42 above and substantially parallel with the draft-bar 20 and a hole is formed in the forward end portion of the secondary draft-bar registering with the hole in the forward end of the draft-bar 20 and adapted to receive and pivot on the pin or bolt 21. A keeper plate 44 is located beneath and fixed at its ends to end portions of the plate 42 (Fig. 3) and the central portions of said plates are spaced apart to form a slot 45 adapted to receive and form a slideway for the draft-bar 20, the fastenings between the ends of the plates being by bolts 46. Registering holes 47 are formed in the plates 42, 44 in rows longitudinally of and near the rear margins of said plates, and pins or bolts 48, 49 are selectively mounted in said holes on opposite sides of the draft-bar 20. When the pins 48, 49 are removed from the plates 42, 44, the draft-bar may be moved through an arc within the range permitted by the slot 45, articulating on the axis of the bolt 21, and the plates limit and confine said bar as to vertical movement relative thereto; but the pins may be employed selectively to fix the relation, in respect of registry or angularity, of the draft-bars. The bolts 46 preferably are bushed in the ends of the plates 42, 44 and yokes 50, 51 are mounted on and extend upwardly from end portions of the plate 42 and are pivoted on upper end portions of said bushings and secured by said bolts pivotally. A reach 52 is pivoted at its forward end on a horizontal axis to the yoke 50 by means of a bolt 53, and is, in turn, pivoted on a vertical axis to the plate 42 by one of the bolts 46, thus providing great flexibility between the reach and the plate. The reach 52 is arched rearwardly and extends in a line forming an acute angle with the longitudinal plane of the draft-bar 43; but said angle varies in acuteness with the oscillation of the reach on the axis of the bolt 46. The reach 52 may be of any suitable construction and is adapted to be connected to a substantial duplicate on the opposite side of the median line of the implement (not shown) by suitable stays indicated generally by the numerals 54, 55, which stays are pivoted at their ends to various portions of the reaches and provide lateral flexibility or articulation in the frame thus formed. A hand lever 56 is fulcrumed between its ends, on a horizontal axis, to the reach 52 adjacent the yoke 50 and is provided with detent devices 57 adapted to engage, at times, a toothed segment 58 on the reach and hold the lever in any position in which it may be placed manually. A lever or evener bar 59 is pivoted at one end to the reach 52 coincident with the connection of one end of the stay 54 to said reach and extends toward the median line of the implement, substantially horizontally, the inner end portion of the lever being carried freely in a slideway 60 suspended by the stay 54, whereby said lever is permitted a range of movement through an arc and suspended horizontally. A disk gang 61 is located at the rear of the disk gang 37 and one (the outer) end portion thereof is pivotally connected by a stem 62 to the rear end of the reach 52, while the inner end portion of said gang 61 is pivotally connected by a rod 63 to the inner end portion of the lever or evener bar 59. Suitable boxes or bearings 64 are employed to make the connections between the gang shaft and the stem 62 and rod 63 and a brace 65 may further be employed to stay the stem 62 and its box to the reach 52. A rod 66 pivotally connects the hand lever 56 to the inner end portion of the lever or bar 59, whereby any oscillation of the hand lever is communicated through the lever or bar 59, and rods to a movement of the gang 61 through an arc articulating on the stem 62. It is to be understood that the lever 56, lever or evener bar 59, slide-way 60, gang 61, stem 62, rod 63, boxes 64, brace 65 and rod 66 are duplicated on the opposite side of the stub tongue from those parts shown. Further, in this specification, the disk gang 37 will be referred to in plural as the front gangs, and the disk gang 61 will be referred to in plural as the rear or trailing gangs. As the point of draft on the rear gangs, at the lower ends of stems 62 and rear ends of rods 63, is at a lower level than the forward ends of the reach and attachment to the connector, it follows that there is a tendency, as is common in devices of this kind, to lift or pull the rear harrows out of the ground; but by extending the reach forwardly over and beyond the front gangs, to a point of connection to the draw bar of the tractor, this tendency is overcome or greatly diminished by lessening the angle between the line of draft and the soil. It is to be understood that the rear gangs 61 are in spaced relation to the front gangs 37 so that, irrespective of any adjustment of the gangs through the levers 33 and 56, no part of any gang will at any time contact with another gang, whether operation is on a straight line or any curve. The implement may be operatively attached to and drawn by a tractor as follows: A clevis 67 is mounted in embracing relation with the forward end portions of the draft bars 20 and 43 and is pivoted thereto on a vertical axis by the bolt 21, which bolt preferably is bushed in the bars, and said clevis is adjustably pivoted to an upright clevis 68, having a series of holes 69, by a bolt 70 arranged horizontally and adapted for selective mounting in said holes; the clevis 68 being further pivoted on a vertical axis to the draw bar 71 of the tractor by a bolt 72. Thus provision is made for adjusting the altitude of the hitch between the draft bars and the draw-bar by selective mounting of the bolt 70 in one or another of the holes 69.

In Figure 5, besides the showing of one form of hitch between the draw-bar and draft bars, the tongue-truck, coupling head and coupling member are omitted and the draft-bar 20 is formed with a rearward extension 20' extending within and rigidly secured to the forward end portion of the stub-tongue 26. In all other respects the construction is the same as above described, and this construction is indicated where and whenever the prime mover is a tractor exclusively, since the draw-bar 71 of the tractor is effective in carrying the hitch and applying the draft at all times.

In Figure 6 the draft-bar 20 is shown with a forward hooked extension 20'' embracing the forward end of the draft-bar 43 and provided with a hole to receive the upper end of the bushed bolt 21. In this view, also, the bolt 21 is combined with the eye-bolt 22 and bears the index 21', the brace yoke 23 connecting with the eye of said bolt. The hooked or recurved extension 20'' provides a horizontal eye adapted to receive the central portion of a clevis. When and where attachment is to be made to a whiffletree 73, for animal-draft, a twisted clevis 74 would be used; but to provide attachment to a tractor the twisted clevis would be omitted and a straight clevis, of common form, would be substituted for it or for the clevis 67 to engage a pin such as 70 for selective and adjustable mounting in the clevis 68. When the animal-draft is employed the use of the tongue-truck is indicated, to sustain the hitch at the desired altitude and control the depth of cut of either front or rear gangs.

The reaches and rear gangs may be disconnected and removed by removing the bolts 53 and, thereafter, the front gangs may be used alone. Also, the coupling member 24, stub-tongue 26, transverse frame and front disk gangs may be disconnected and removed by removing the bolt 25 and, thereafter, the rear gangs may be used alone. To make such separation when the construction of Figure 5 is employed the stub-tongue 26 would be disconnected from the draft-bar extension 20'. In either or any event, the gangs may be used selectively or in tandem relation, as desired, without altering the hitch or support for the hitch. It is to be understood that the use and operation of either the front or the rear gangs selectively is in no sense dependent on or varied by the other; the relation thereof being wholly to the connector or hitch. This is also true when the gangs are used in tandem arrangement, the operation of each being wholly independent of the other and dependent entirely on the connector or hitch. There is an inter-relation of the front and rear gangs in this:—The front gangs preferably are arranged for out-throw of soil as shown and the rear gangs are preferably arranged for in-throw of soil, and the rear gangs are arranged so that the disks thereof will trail exactly in the paths or furrows of the disks of the front gangs and turn ridges or peaks of solid soil in the opposite direction as well as turning, stirring and pulverizing the soil slices or lumps turned by the front disks. This is the normal tendency, and the pins 48, 49 are provided to modify the trailing relation at times laterally, the relation of the gangs also being subject to modification temporarily at all times by manipulation of either lever 33 or 56. In straight-away travel of the implement and straight trailing of the gangs, the angularity of the gangs to the line of travel is adjusted to attain the desired penetration by the disks; hence any change of angularity (by the levers) would alter the penetration and this adjustment should be governed and controlled by the character and temper of the soil and the crop prepared for. However, when the soil being treated by the gangs on one side of the median line of the implement differs in character or temper from that being treated by the laterally opposite gangs, or where the implement is being used laterally on a side-hill, it is desirable to adjust the trailing relation by selective lateral adjustment of the pins 48, 49 in the plates 42, 44 to compensate for side-draft and skidding of the implement. By extending the reaches over and beyond and forwardly of the front gangs and attaching them to a connector wholly in advance of and not dependent on the front gangs or the frame thereof, the line of draft on the rear gangs is lengthened, which is equivalent to decreasing the angle of the line of draft relative to the surface of the soil and is tantamount to lowering the hitch in its effect in increasing the penetration of the rear disks. Because of this arrangement the rear disks are endowed with the function of deeper penetration than the front disks as contra-distinguished to a common practice of loading the rear disks or the frames thereof with extraneous weights to accomplish such penetration. It is to be understood, however, that the exact trailing relation of the rear disks on the paths of the front disks, above pointed out, contributes to the increased penetration by the rear disks as well as applying the function of turning over the ridges and peaks of solid soil omitted in the operation of the front disks. Because of the extension of the reaches over and beyond and forwardly of the front gangs and attaching them to a connector wholly in advance of and not dependent on the front gangs or the frame thereof, in turning the implement at a corner or to reverse the travel thereof the rear gangs will follow an arc of less radius than the front gangs, thus avoiding buckling or skidding (endwise movement) of the rear gangs and avoiding ridging of the soil at the end of the row. This operation of turning and its improved results are helped materially by removal of the pins 48, 49 so that the draft-bars 20 and 43 are separated in their articulation on the clevis or clevises.

It is to be understood that the hitch mechanism and draft device herein shown and described may be used in connection with trailer devices other than disk harrows of single or double form, and I do not desire to be understood as limiting myself to the precise application thereof herein disclosed.

Attention is called to the fact that at times, namely when the bolts 48, 49 are removed (which is the normal operating condition), the draft bars from the two gangs or other trailers extend entirely independently therefrom entirely to the tractor or other prime mover, articulating on the pivot 21 in the clevis attached to said prime mover. The pivotal points of the two trailer devices are not supported by and are not dependent upon a truck or cart for support, but such truck or cart may be used at times as an auxiliary support if desired.

I claim as my invention—

1. The combination with a prime mover of draft means for tandem disk harrows, comprising disk gangs adapted to be arranged in tandem relation to each other, independent means for conjunctively and flexibly connecting said gangs to said prime mover, said independent means having a range of movement relative to each other, and means for limiting such range of movement.

2. The combination with a prime mover of draft means for tandem disk harrows, comprising disk gangs adapted to be arranged in tandem relation to each other, independent means for conjunctively and flexibly connecting said gangs to said prime mover, said independent means having a range of movement relative to each other, and means for limiting such range of movement laterally.

3. The combination with a prime mover of draft means for tandem disk harrows, comprising disk gangs adapted to be arranged in tandem relation to each other, independent means for conjunctively and flexibly connecting said gangs to said prime mover, said independent means having a range of movement relative to each other, and means for selectively limiting the range of lateral movement, one of said connecting means being arched over and to the rear of the foremost gang.

4. In tandem disk harrows, a connector, separate draft-bars pivoted thereto, a front gang flexibly attached to one bar, and a rear gang flexibly connected to the other bar, said bars articulating independently on the connector and having a range of lateral movement independent of each other.

5. In tandem disk harrows, a connector, a draft-bar pivoted on a vertical axis to said connector, a coupling head pivoted on a vertical axis to said bar, a coupling member pivoted on a horizontal axis to said head, and a front disk gang attached to said coupling member.

6. In a disk harrow, a connector, a draft-bar pivoted on a vertical axis to said connector, a stub-tongue pivoted on vertical and horizontal axes to said draft-bar and a disk gang attached to said stub-tongue.

7. In a disk harrow, a connector adapted to be supported at a selected altitude, a draft-bar pivoted on a vertical axis to said connector, means for supporting said draft-bar at the end thereof opposite to the connector, and a disk gang at the rear of said draft-bar and adapted to be drawn thereby, the connection between said draft-bar and disk-gang including articulating means having a horizontal axis.

8. In a disk-harrow, a connector adapted to be supported at a selected altitude, a draft-bar pivoted on a vertical axis to said connector, means for supporting said draft-bar supplementary to the connector, a disk gang at the rear of said draft bar support, and connecting means between the draft-bar and disk gang including articulating means having a horizontal axis and means for limiting the articulation of the connecting means.

Signed at Des Moines, in the county of Polk and State of Iowa, this 9th day of October, 1920.

FRANK H. FRENCH.